United States Patent
Phillips et al.

(10) Patent No.: US 7,653,797 B1
(45) Date of Patent: Jan. 26, 2010

(54) OPTIMIZING A MARKING PHASE IN MARK-SWEEP GARBAGE COLLECTORS BY REDUCING PAGING ACTIVITY

(75) Inventors: Anthony H. Phillips, Southampton (GB); Timothy E. Preece, Southampton (GB); Andrew D. Wharmby, Romsey (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/347,394

(22) Filed: Dec. 31, 2008

(51) Int. Cl.
*G06F 12/02* (2006.01)

(52) U.S. Cl. .................. 711/170; 711/133; 711/159; 711/206; 707/206

(58) Field of Classification Search .................. None
See application file for complete search history.

(56) References Cited

U.S. PATENT DOCUMENTS

| | | | |
|---|---|---|---|
| 4,797,810 A | | 1/1989 | McEntee et al. |
| 4,989,132 A | * | 1/1991 | Mellender et al. ........... 717/139 |
| 4,989,134 A | | 1/1991 | Shaw |
| 6,338,073 B1 | | 1/2002 | Houldsworth et al. |
| 7,065,617 B2 | * | 6/2006 | Wang ......................... 711/159 |
| 7,395,384 B2 | | 7/2008 | Sinclair et al. |
| 2005/0198088 A1 | * | 9/2005 | Subramoney et al. ....... 707/206 |
| 2006/0074990 A1 | | 4/2006 | Burka et al. |

FOREIGN PATENT DOCUMENTS

| | | |
|---|---|---|
| EP | 0288146 B1 | 2/1995 |
| JP | 362031456 A | 2/1987 |

OTHER PUBLICATIONS

Cher, C.Y., et al., "Software prefetching for mark-sweep garbage collection: hardware analysis and software redesign," [online] Proc. 11th Int'l. Conf. on Architectural Support for Programming Languages & Operating Systems, pp. 199-210, 2004, [retrieved Dec. 29, 2008] retrieved from the Internet: <http://www.cs.utexas.edu/users/speedway/DaCapo/papers/gc.pdf>.

(Continued)

*Primary Examiner*—Christian P Chace
*Assistant Examiner*—Alan M Otto
(74) *Attorney, Agent, or Firm*—Patents on Demand, PA; Brian K. Buchheit

(57) ABSTRACT

A garbage collector can initialize a garbage collection cycle. The cycle can include a mark phase and a sweep phase. The mark phase can traverses a complete set of objects in a heap. The heap can be associated with a virtual application memory including a primary memory and a secondary memory. The virtual application memory can be managed by a virtual memory manager, which moves pages between the primary memory and the secondary memory. Information can be bidirectionally communicated between a garbage collector and the virtual memory manager. A default order in which the objects are evaluated during the mark phase can be altered to minimize paging activity. The altering of the order can be based at least in part upon information obtained from the virtual memory manager.

8 Claims, 2 Drawing Sheets

OTHER PUBLICATIONS

Hertz, M., et al., "Page-Level Cooperative Garbage Collection," [online] Technical Report TR-04-16, University of Massachusetts, 2004, [retrieved Dec. 29, 2008] <http://www.cs.umass.edu/~emery/pubs/04-16.pdf>.

Chicha, Y., et al., "A Localized Tracing Scheme Applied to Garbage Collection," [online] APLAS 2006, [retrieved Dec. 29, 2008] retrieved from the Internet <http://www.csd.uwo.ca/~watt/pub/reprints/2006-APLAS-LTS.pdf>.

Jones, R., "Dynamic Memory Management Challenges for Today and Tomorrow," [online] Int'l Lisp Conf. pp. 115-124, Cambridge, Apr. 2007, [retrieved Dec. 29, 2008] retrieved from the Internet http://www.cs.kent.ac.uk/pubs/2007/2506/content pdf>.

Hertz, M., et al., "Garbage collection without paging," [online] Proc. 2005 ACM SIGPLAN Conf. on Programming Language Design & Implementation, Jun. 12-15, 2005, [retrieved Jul. 29, 2009] retrieved from the Internet <http://www.ittc.ku.edu/~kulkarni/teaching/archieve/EECS700-Spring-2009/papers/GC_paging.pdf>.

* cited by examiner

OPTIMIZING A MARKING PHASE IN MARK-SWEEP GARBAGE COLLECTORS BY REDUCING PAGING ACTIVITY

BACKGROUND

The present invention relates to the software garbage collection, and, more particularly, to optimizing a marking phase in mark-sweep garbage collectors by reducing paging activity.

Garbage collection is a form of automatic memory management that reclaims garbage, which is memory used by objects that are not reachable. A reachable object can be defined as an object for which there exists some variable in the program environment that leads to it, either directly or through references from other reachable objects. Assuming objects are stored in a heap, garbage objects are objects which have no references pointing to them. Anything referenced from a reachable object is itself reachable, meaning that reachability is a transitive closure.

The heap is a portion of memory allocated for objects, which can be managed by a memory manager. A heap can be a virtual memory space, which means that the heap size can be greater than an amount of physical random access memory (RAM) dedicated to the heap. When heap memory exceeds dedicated RAM, a less desirable memory (e.g., hard drive memory) is used to satisfy the difference. Paging is a technique used by many virtual memory managers to move sections of memory, called pages, between the RAM and the less desirable memory, which can be referred to as a secondary memory. When a garbage collected application does not fit in RAM and paging is needed, performance degrades substantially.

That is, execution of conventional garbage collection program can result in an excessive swapping of pages of memory back and forth between RAM and secondary memory, which is often referred to as thrashing. This type of thrashing can result from a lack of cooperation between the garbage collector and a virtual memory manager. Garbage collectors can be classified into four categories, VM-oblivious, VM-sensitive, VM-aware, and VM-cooperative) based upon their relationship with a virtual memory manager. VM-oblivious garbage collectors, which includes most traditional garbage collectors, ignore virtual memory altogether.

VM-sensitive garbage collectors take steps to limit paging problems, yet do not permit communications between a garbage collector and a virtual memory manager. VM-sensitive garbage collections can include generational garbage collectors and ephemeral garbage collectors. In either, a majority of garbage collection cycles (e.g., minor cycles) can execute that do not traverse an entire object map, yet still reclaim a majority of unreachable objects. Generational garbage collectors will occasionally execute a major cycle, which takes longer than a minor cycle yet which traverses the entire object map. Major cycles are more likely to result in paging problems.

Real-world implementations of VM-aware and VM-cooperative garbage collectors are scarce. VM-aware garbage collectors permit unidirectional communication between garbage collectors and a virtual memory manager. Academic foundations for this type of garbage collection exists (references included in the information disclosure statement (IDS) accompanying the instant application).

VM-cooperative garbage collectors permit bidirectional communication between garbage collectors and a virtual memory manager. Academic foundations for this type of garbage collection exists, specifically in a paper titled "Page-Level Cooperative Garbage Collection" (reference included in the IDS accompanying the instant application), which describes a Hippocratic Collector (HC).

The HC divides the heap into superpages, which are aligned groups of similar pages. The HC communicates with the virtual memory manager only under memory pressure. When notified by the virtual memory manager that increased memory pressure will soon cause paging, the HC works to keep heap memory resident and avoid mutator page faults. When heap pages must be evicted, a "book-marking" algorithm allows HC to collect only those objects in main memory and eliminates page faults caused by the garbage collector. One significant drawback to the HC is that bookmarked objects must be treated as reachable, so the HC will not be able to reclaim all unused space.

DETAILED DESCRIPTION

Figure 1:
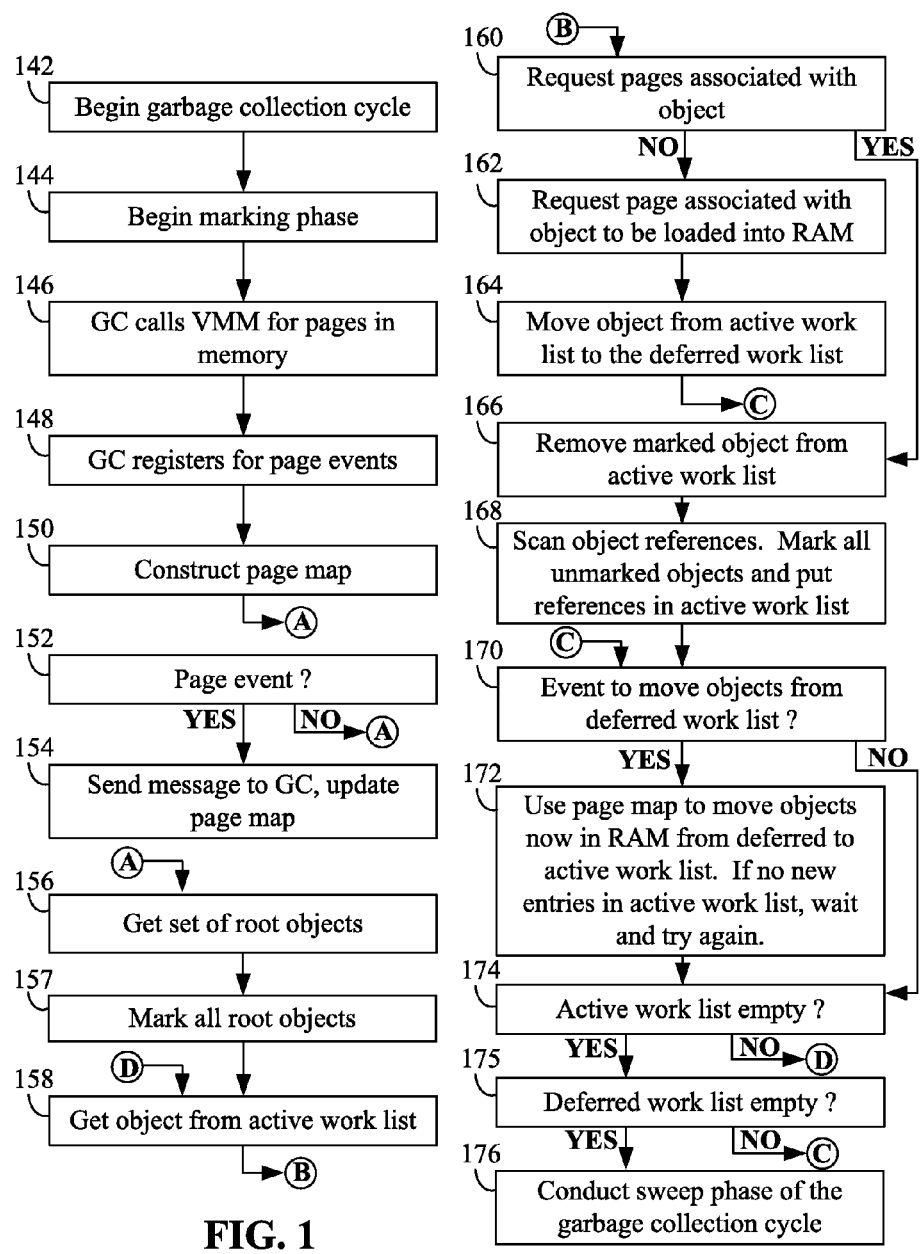
FIG. 1 is schematic diagram of a system and method for optimizing a marking phase in mark-sweep garbage collections by reducing paging activity in accordance with an embodiment of the inventive arrangements disclosed herein.

The disclosure provides a mark-sweep garbage collection methodology permitting a complete transversal of an object graph in a mark phase. The methodology modifies an order in which objects are processed to minimize negative effects of paging. The methodology is a VM-cooperative garbage collector (GC), since bidirectional communications between the GC and a virtual memory manager (VMM) occur. More specifically, a page map accessible by the GC is maintained. The GC marks all objects that are in memory according to the page map and defers all others. Page load request are submitted when an object is deferred, so that by the time it is again ready to be marked as reachable or not, it should be loaded in memory. Thus, excessive page loads are avoided.

The present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer usable storage medium having computer usable program code embodied in the medium. In a preferred embodiment, the invention is implemented in software, which includes but is not limited to firmware, resident software, microcode, etc.

Furthermore, the invention can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The computer usable medium may include a propagated data signal with the computer usable program code embodied therewith, either in baseband or as part of a carrier wave. The computer usable program code may be transmitted using any appropriate medium, including, but not limited to the Internet, wireline, optical fiber cable, RF, etc.

Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. Examples of a computer readable storage medium include a semiconductor or solid state memory, magnetic tape, a removable computer diskette, a random access memory (RAM), a read-only memory (ROM), an erasable programmable read-only memory (EPROM or Flash memory, a rigid magnetic disk and an optical disk. Current examples of optical disks include compact disk—read only memory (CD-ROM), compact disk—read/write (CD-R/W) and DVD. Other computer readable medium can include a transmission media, such as those supporting the Internet, an intranet, a personal area network (PAN), or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer usable or computer readable medium can even include paper or another suitable medium upon which the program is printed, as the program can be electronically captured, for instance, via optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is schematic diagram of a system 100 and method 140 for optimizing a marking phase in mark-sweep garbage collections by reducing paging activity in accordance with an embodiment of the inventive arrangements disclosed herein.

The system 100 shows a garbage collection environment 102, which includes a heap 110 having a set of live objects 112 managed by garbage collector 114. The garbage collector 114 can be a mark and sweep garbage collector 114 optimized to reduce paging activity. The optimization requires communication (shown as message exchanges 106 and 107) between the garbage collector 114 and a virtual memory manager 120. The garbage collector 114 can utilize an active work list 115, a deferred work list 116, an object graph 117, and a page map 118 during a marking phase of a garbage collection cycle.

The virtual memory manager 120 can manage a virtual memory 122 used for the heap 110. The virtual memory 120 can include a primary memory 124 (e.g., Random Access Memory (RAM)) and a secondary memory 125 (e.g., a hard drive memory, a solid state device (SSD) memory, etc.), where pages 126 are swapped between the two. An environment 103 in which the virtual memory manager 122 resides can be different from the garbage collection environment 102.

Method 140 elaborates upon a set of activities that are performed during a garbage collection cycle. The method 140 can execute in context of system 100. Method 140 can commence when a garbage collection cycle begins, as shown by step 142. In step 144, a marking phase of the cycle can begin. In step 146, a garbage collector 114 can convey a request 106 to a virtual memory manager 120 for pages in memory 124. Manager 120 can provide a response, which is used to construct a page map 118, as shown by step 150. The page map 118 can indicate which pages 126 are in memory (e.g., RAM) 124 and which are not (i.e., are located in secondary memory 125). It should be noted that information for constructing the page map 118 can result from a single efficient kernel call.

The garbage collector 114 can register for page events, as shown by step 148. Because of the registration, when a page event occurs (step 152), a message 107 can be sent to the garbage collector 114, which is used to update the page map 118, as shown by step 154. For example, updates 107 can be sent when any heap 110 pages 126 are evicted from memory 124. Thus, the page map 118 can remain current throughout the marking phase of the garbage collection cycle.

In step 156, the root objects (e.g., objects 224 from FIG. 2) can be placed in an active work list 115. Initially, the deferred work list 116 can be empty. In step 157, all root objects can be marked. Each object 112 can then be retrieved from the active work list, as shown by step 158. In step 160, the garbage collector 114 can consult page map 118 to determine if a set of one or more pages associated with the object 112 is loaded in RAM 124. If not, a request 106 to load the page(s) 126 associated with the object 112 can be sent to the virtual memory manager 122, as shown by step 162. In step 164, the object 112 can be moved from the active work list 115 to the deferred work list 116.

When the object 112 is in RAM 124, method 140 can progress from step 160 to step 166, where marked objects can be removed from the active work list. In step 168, object references can be scanned. Based upon scanning results, all unmarked objects can be marked appropriately and their references can be put in the active work list.

An event to move objects 112 from the deferred work list 116 to the active work list 115 using the page map 230 may occur, as indicated by step 170. This event can occur at intervals or when the garbage collector 114 exhausts the active work list 115, depending upon implementation choices. When the event for which the garbage collector 114 is registered fires, the page map can be used to more objects now in RAM from the deferred work list to the active work list, as shown by step 172. If no new entries for the active work list exist in RAM, a wait cycle can commence after which another attempt to move objects based upon the page map can occur.

In step 174, a check can be made as to whether the active work list is empty. If not, the method can progress from step 174 to step 158. When empty, a check to see if the deferred work list is empty can be performed, as shown by step 175. When the deferred work list is also empty, a sweep phase of the garbage collection cycle can be conducted, as shown by step 176. The sweep phase can utilize a moving or non-moving strategy depending upon implementation specifics choices. When objects exist in the deferred list, the method can progress from step 175 to step 170.

Figure 2:
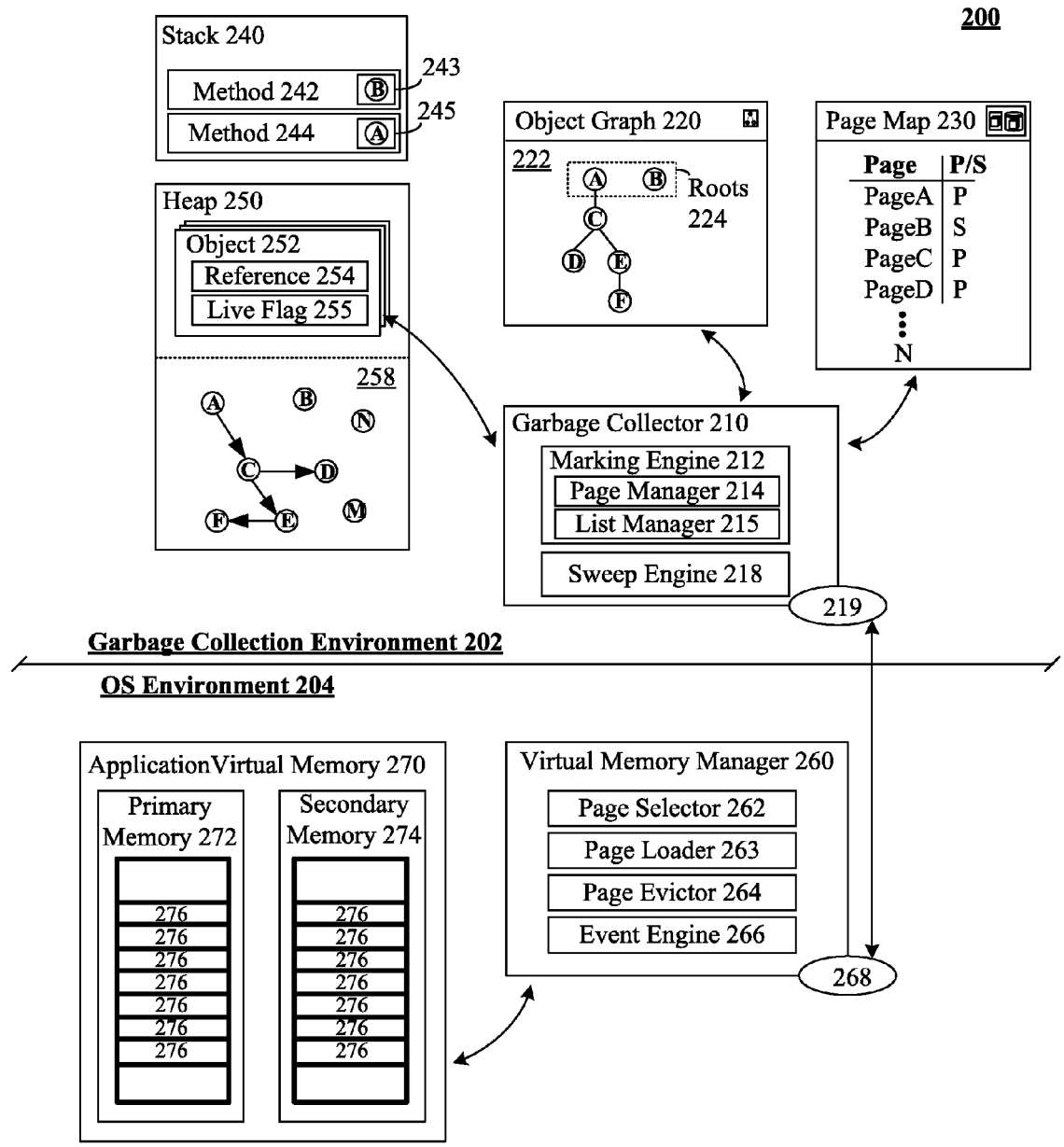
FIG. 2 is a schematic diagram of a system for optimizing a marking phase in mark-sweep garbage collections by reducing paging activity in accordance with an embodiment of the inventive arrangements disclosed herein.

FIG. 2 is a schematic diagram of a system 200 for optimizing a marking phase in mark-sweep garbage collections by reducing paging activity in accordance with an embodiment of the inventive arrangements disclosed herein. System 200 can represent on embodiment of system 100 within which details are more elaborately expounded upon.

The heap 250 stores all objects 252 created by a program executing within the garbage collection environment 202. In a JAVA VIRTUAL MACHINE (JVM) environment, for example, objects are created by the "new" operation. The marking engine 212 of garbage collector 210 is responsible for marking a live flag 255 for each heap object 252 to indicate whether that object 252 is reachable or not. The live flag 255 can be a single bit, in one embodiment. Reachable objects 252 are those objects referenced by some variable in environment 202.

An object graph 220 can be constructed that shows reference relationships of an application executing in environment 202. Objects 252 referenced directly from the stack 240 can be referred to as roots 224, (for example, methods 242 and 244 reference objects 243, 245 (Objects B and A).

Example 258 and corresponding graph example 222 show a set of references existent among a set of objects 252, which include reachable and unreachable ones. According to the examples 258 and 222, Object A can reference (using reference 254 to hold necessary values) Object C. Object C can reference Objects D and E. Object E can reference Object F. Object B is a root 224 that is referenced by method 242. Objects A-F are considered reachable while Objects N and M are unreachable. A full cycle of garbage collector 210 should remove Object N and Object M from the heap 250.

Appreciably, the heap 250 is a dynamic runtime memory and a reachable status of heap 250 objects 252 is constantly changing as an application executes in environment 202. For example, when method 242 completes and is therefore removed from the stack 240, Object B is no longer a root 224 and is no longer reachable. Similarly, when method 244 completes Object A is no longer a root 224, and each object reachable because of Object A (e.g., Objects C-F) as well as Object A itself become unreachable.

The garbage collection environment 202 within which the heap 250 resides is often implemented as a level of abstraction above an environment 204 within which a memory manager 260 executes. For example, a JVM environment is implemented as a layer of abstraction above an operating system.

In environment 204, a virtual memory manager 260 can be responsible for managing application virtual memory 270. In one embodiment, virtual memory manager 260 can dynamically change a size of application virtual memory 270 by adding additional secondary memory 274 as needed. For example, when objects 252 in the heap 250 begin to exceed a current quantity of associated application virtual memory 270, the virtual memory manager 260 can add more secondary memory 274 to provide additional storage space for storing objects 252.

This virtual memory 270 can include both a primary memory 272 (e.g., RAM) and a secondary memory 274 (e.g., a hard drive, solid state drive, and the like), where primary memory 272 is a faster memory. Secondary memory 274 can provide an additional amount of storage space when needed. The memory manager 260 can swap pages 276 or segments of memory between the primary 272 and secondary 274 memories. The heap 250 can be implemented as an application virtual memory 270, where objects 252 in the heap are stored in one or more pages 276 of memory 270.

A majority of garbage collectors in existence are not configured to communicate with the virtual memory manager 260. Thus, the garbage collector 210 performs garbage collection activities for objects 252 in a manner where an amount of page swapping between memories 272 and 274 is unknown. Similarly, the virtual memory manager 260, and more specifically a page evictor 264 selects which page 276 is to be evicted from primary memory 272 when secondary memory 274 page 276 is loaded (by page loader 263). Page related activity conventionally occur in a manner insensitive to processes occurring in environment 202. The lack of communications between collector 210 and manager 260 can result in thrashing or an excessive amount of paging activity.

In system 200, bidirectional communications can occur between the garbage collector 210 and the virtual memory manager 260. In one embodiment, these communications can occur through one or more interfaces 219, 268, such as an application program interface (API).

More specifically, a page manager 214 can be responsible for communicating with the virtual memory manager 260, so that a page map 230 is able to be maintained. The page map 230 can indicate which pages are in primary memory 272 and which are in secondary memory 274. The page manager 214 can construct page map 230 at a start of a garbage collection cycle, such as by making a single kernel call to the manager 260. Page manager 214 can also register for page events with the event engine 266. Thus, each time a page is moved between the different memories 272, 274, the event engine 266 can send an update to the page manager 214, which in turn updates the page map 230.

The garbage collector 210 can use the page map 230 and list manager 215 together to defer a handling of objects in a mark phase until those objects are loaded in memory. The list manager 215 can maintain at least two lists, which include an active and a deferred work list. In one embodiment, the lists 115 and 116 can be implemented as last-in-first-out (LIFO) stacks.

The sweep engine 218 can be a moving or a non-moving engine 218, which is irrelevant to operational specifics of the marking engine 212.

In one embodiment, the garbage collector 210 can register with the virtual memory manager 260. That is, information from the garbage collector 210 can be used by page selector 262, when determining which pages 276 should be evicted from primary memory 272.

The diagrams in FIGS. 1-2 illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method for garbage collection comprising: a garbage collector using a processor initializing a garbage collection cycle, wherein said garbage collection cycle comprises a mark phase and a sweep phase, wherein said mark phase traverses a complete set of objects in a heap, wherein said heap is associated with a virtual application memory comprising a primary memory and a secondary memory, wherein the virtual application memory is managed by a virtual memory manager, which moves pages between the primary memory and the secondary memory; communicating information bidirectionally between the garbage collector and the virtual memory manager; and altering a default order in which the objects are evaluated during the mark phase to minimize paging activity, wherein the altering of the order is based at least in part upon information obtained from the virtual memory manager; wherein a marking of objects in the heap that are not associated with pages in the primary memory is deferred until the associated pages are placed in primary memory, wherein a page load request is submitted each time a marking of an object is deferred, wherein objects that are associated with pages in primary memory are marked while objects that are not associated with pages in primary memory are deferred.

2. The method of claim 1, further comprising: querying an operating system for an eviction status of every page in the heap at a beginning of the garbage collection cycle; building a page map of pages that indicates which page associated with the heap is included in the primary memory and which page is included in the secondary memory; the garbage collector registering with the virtual memory manager for page events; responsive to the registering, the garbage collector receiving at least one change in page status; and responsive to receiving at least one change in page status, updating the page map to reflect the received at least one change.

3. The method of claim 1, further comprising: during the mark phase, establishing an active work list and a deferred work list, wherein at the beginning of the garbage collection cycle the active work list comprises all root objects in the heap and the deferred work list comprises a null set; for a each object in the active work list: determining if the object is in the primary memory; when the object is not in the primary memory, moving the object from the active work list to the deferred work list and submitting a request to load all pages associated with the object to the primary memory; when the object is in the primary memory, marking the object as reachable and removing the object from the active work list; and when the active work list is null and the deferred work list includes at least one object, moving all objects in primary memory in the deferred work list to the active work list.

4. The method of claim 1, wherein the garbage collection cycle executes in a garbage collection environment which is implemented in an abstraction layer above an operating system environment, wherein the virtual memory manager is implemented within the operating system environment.

5. A computer program product for garbage collection, said computer program product comprising a computer readable storage medium having computer usable program code embodied therewith, the computer usable program code comprising: computer usable program code configured to have a garbage collector to initialize a garbage collection cycle, wherein said garbage collection cycle comprises a mark phase and a sweep phase, wherein said mark phase traverses a complete set of objects in a heap, wherein said heap is associated with a virtual application memory comprising a primary memory and a secondary memory, wherein the virtual application memory is managed by a virtual memory manager, which moves pages between the primary memory and the secondary memory; computer usable program code configured to communicate information bidirectionally between a garbage collector and the virtual memory manager; and computer usable program code configured to alter a default order in which the objects are evaluated during the mark phase to minimize paging activity, wherein the altering of the order is based at least in part upon information obtained from the virtual memory manager; wherein a marking of objects in the heap that are not associated with pages in the primary memory is deferred until the associated pages are placed in primary memory, wherein a page load request is submitted each time a marking of an object is deferred, wherein objects that are associated with pages in primary memory are marked while objects that are not associated with pages in primary memory are deferred.

6. The computer program product of claim 5, further comprising: computer usable program code configured to query an operating system for an eviction status of every page in the heap at a beginning of the garbage collection cycle; computer usable program code configured to build a page map of pages that indicates which pages associated with the heap are resident in the primary memory and which pages are resident in the secondary memory; computer usable program code configured to have the garbage collector register with the virtual memory manager for page events; computer usable program code configured to have the garbage collector receive at least one change in page status; and computer usable program code configured to update the page map to reflect the received at least one change responsive to receiving at least one change in page status.

7. The computer program product of claim 5, further comprising: computer usable program code configured to, during the mark phase, establish an active work list and a deferred work list, wherein at the beginning of the garbage collection cycle the active work list comprises all root objects in the heap and the deferred work list comprises a null set; computer usable program code configured to, for a each object in the active work list: determine if the object is in the primary memory; when the object is not in the primary memory, move the object from the active work list to the deferred work list and submit a request to load all pages associated with the object to the primary memory; when the object is in the primary memory, mark the object as reachable and remove the object from the active work list; and when the active work list is null and the deferred work list includes at least one object, move all objects in primary memory from the deferred work list to the active work list.

8. The computer program product of claim 5, wherein the garbage collection cycle executes in a garbage collection environment which is implemented in an abstraction layer above an operating system environment, wherein the virtual memory manager is implemented within the operating system environment.

* * * * *